(12) United States Patent
Abe

(10) Patent No.: US 9,224,288 B2
(45) Date of Patent: Dec. 29, 2015

(54) CONTROL APPARATUS, CONTROL METHOD, PROGRAM AND SYSTEM

(75) Inventor: Yuuichi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 428 days.

(21) Appl. No.: 13/404,575

(22) Filed: Feb. 24, 2012

(65) Prior Publication Data

US 2012/0253480 A1   Oct. 4, 2012

(30) Foreign Application Priority Data

Mar. 30, 2011   (JP) ................. 2011-075764

(51) Int. Cl.
*G05B 11/01* (2006.01)
*G08C 17/02* (2006.01)
*G08C 19/00* (2006.01)

(52) U.S. Cl.
CPC ............... *G08C 17/02* (2013.01); *G08C 19/00* (2013.01); *G08C 2201/51* (2013.01)

(58) Field of Classification Search
CPC ...... G05B 15/02; G05B 19/05; G05B 19/042; G05B 19/0421; G05B 19/0423; G05B 19/0426; G08C 17/02; G08C 19/00; G08C 2201/51; G06F 11/3476; G06F 17/40
USPC ........... 700/12, 15, 17, 19, 20, 27, 32, 33, 83, 700/103, 108, 174; 702/187, 188
See application file for complete search history.

(56) References Cited

U.S. PATENT DOCUMENTS

| | | | |
|---|---|---|---|
| 6,229,439 B1 * | 5/2001 | Tice | 340/506 |
| 6,853,920 B2 * | 2/2005 | Hsiung et al. | 702/1 |
| 6,861,956 B2 * | 3/2005 | Ying | 340/12.52 |
| 6,876,889 B1 | 4/2005 | Lortz et al. | |
| 7,184,861 B2 * | 2/2007 | Petite | 700/295 |
| 7,365,651 B2 * | 4/2008 | Massey et al. | 340/905 |
| 7,663,502 B2 * | 2/2010 | Breed | 340/12.25 |
| 7,710,258 B2 * | 5/2010 | Miller | 340/522 |
| 7,710,260 B2 * | 5/2010 | Miller | 340/522 |
| 7,734,061 B2 * | 6/2010 | Breed et al. | 382/100 |
| 7,738,999 B2 * | 6/2010 | Petite | 700/295 |
| 7,768,380 B2 * | 8/2010 | Breed et al. | 340/426.1 |
| 7,788,008 B2 * | 8/2010 | Breed | 701/45 |
| 7,813,842 B2 * | 10/2010 | Iwamura | 700/292 |

(Continued)

FOREIGN PATENT DOCUMENTS

| | | |
|---|---|---|
| JP | 2004-094432 | 3/2004 |
| JP | 2005-260919 | 9/2005 |

(Continued)

OTHER PUBLICATIONS

European Patent Office, Extended European Search Report issued in connection with European Patent Application No. 12001518.5, dated Jul. 5, 2012. (6 pages).

(Continued)

*Primary Examiner* — Charles Kasenge

(74) *Attorney, Agent, or Firm* — K&L Gates LLP

(57) ABSTRACT

A control apparatus is provided, which includes: a determination section that determines a control command according to sensor information, on the basis of a control rule capable of being set by a user for determining the control command controlling a device; and a control section that controls the device in accordance with the control command determined by the determination section.

8 Claims, 12 Drawing Sheets

(56) References Cited

U.S. PATENT DOCUMENTS

| | | | |
|---|---|---|---|
| 7,961,096 B2 * | 6/2011 | Hall | 340/568.1 |
| 7,983,817 B2 * | 7/2011 | Breed | 701/45 |
| 8,032,264 B2 * | 10/2011 | Breed | 701/1 |
| 8,035,511 B2 * | 10/2011 | Weaver et al. | 340/539.23 |
| 8,054,203 B2 * | 11/2011 | Breed et al. | 340/931 |
| 8,068,942 B2 * | 11/2011 | Breed | 701/1 |
| 8,235,416 B2 * | 8/2012 | Breed et al. | 280/735 |
| 8,350,697 B2 * | 1/2013 | Trundle et al. | 700/291 |
| 8,538,636 B2 * | 9/2013 | Breed | 701/49 |
| 8,686,922 B2 * | 4/2014 | Breed | 345/7 |
| 2003/0233660 A1 | 12/2003 | Slemmer et al. | |
| 2007/0085697 A1 * | 4/2007 | Breed | 340/825.72 |
| 2009/0045946 A1 * | 2/2009 | Miller | 340/540 |
| 2009/0045947 A1 * | 2/2009 | Miller | 340/540 |
| 2009/0045949 A1 * | 2/2009 | Miller | 340/540 |
| 2009/0309756 A1 * | 12/2009 | Mason et al. | 340/870.02 |
| 2010/0145479 A1 * | 6/2010 | Griffiths | 700/17 |
| 2010/0176947 A1 * | 7/2010 | Hall | 340/572.1 |
| 2010/0292858 A1 * | 11/2010 | Iwamura | 700/293 |
| 2012/0179299 A1 | 7/2012 | Gyota et al. | |

FOREIGN PATENT DOCUMENTS

| | | |
|---|---|---|
| JP | 3136714 | 11/2007 |
| JP | 2009-206750 | 9/2009 |
| JP | 2010-182031 | 8/2010 |
| JP | 2011-055121 | 3/2011 |
| WO | 2011/033805 | 3/2011 |

OTHER PUBLICATIONS

Japanese Office Action issued Mar. 31, 2015, for corresponding Japanese Appln. No. 2011-075764 (9 pages).

Reasons for refusal notice issued in connection with Japanese Patent Application No. 2011-075764, dated Dec. 9, 2014. (4 pages).

Notification of the First Office Action issued in connection with Chinese Patent Application No. 2012100813027, dated Aug. 5, 2015. (15 pages).

Reconsideration Report issued in connection with Japanese Patent Application No. 2011-075764, dated Sep. 2, 2015. (4 pages).

* cited by examiner

FIG. 3

| ID | TYPE | OUTPUT | UNIT | DEVICE NAME | LOCATION | ACTIVE |
|---|---|---|---|---|---|---|
| S001 | MOTION SENSOR | PRESENCE OR ABSENCE OF PERSON | – | TV | LIVING ROOM | True |
| S002 | MOTION SENSOR | PRESENCE OR ABSENCE OF PERSON | – | MOTION SENSOR | ENTRANCE | True |
| S003 | TEMPERATURE SENSOR | TEMPERATURE | °C | AIR CONDITIONER | LIVING ROOM | True |
| S004 | ILLUMINANCE SENSOR | ILLUMINANCE | Lx | ILLUMINANCE SENSOR | LIVING ROOM | True |
| S005 | GPS SENSOR | LATITUDE/LONGITUDE/ALTITUDE | DEGREE/DEGREE/m | CELLULAR PHONE | MOBILE | False |
| S006 | DOOR SENSOR | OPEN AND CLOSED | – | DOOR | ENTRANCE | True |
| ... | ... | ... | ... | ... | ... | ... |

FIG. 4

| ID | Sensor ID | Timestamp | VALUE |
|---|---|---|---|
| D001 | S001 | 10/12/2010 08:04:00 | 0 |
| D002 | S002 | 10/12/2010 08:03:00 | 1 |
| D003 | S004 | 10/12/2010 08:04:12 | 218 |
| D004 | S006 | 10/12/2010 08:04:18 | 1 |
| ⋮ | ⋮ | ⋮ | ⋮ |

FIG. 5

| ID | RULE ID | From | To |
|---|---|---|---|
| C001 | R001 | S006 | M001 |
| C002 | R001 | S001 | M002 |
| C003 | R001 | S004 | M003 |
| C004 | R001 | M001 | M004 |
| C005 | R001 | M002 | M004 |
| C006 | R001 | M003 | M004 |
| C007 | R001 | M004 | A001 |
| ⋮ | ⋮ | ⋮ | ⋮ |

$$S = \sum_i x_i$$

$y = 1$ IF $S \geq th$
$y = 0$ IF $S < th$

FIG. 8

| ID | Threshold |
|---|---|
| M001 | S == 1 |
| M002 | S == 0 |
| M003 | S ≥ 150 |
| M004 | S == 3 |
| ⋮ | ⋮ |

FIG. 9

| ID | Action |
|---|---|
| A001 | NOTIFICATION BY MAIL |
| A002 | AIR CONDITIONER STARTUP |
| A003 | TURN OFF POWER SOURCE |
| A004 | RING ALARM |
| ⋮ | ⋮ |

$$S = \sum_i x_i$$

$y = 1$ IF $th1 \leq S < th2$
$y = 0$ IF $S < th1$ OR $th2 \leq S$ $$S = \sum_i x_i - th$$

$$y = \frac{1}{1+e^{-S}}$$

CONTROL APPARATUS, CONTROL METHOD, PROGRAM AND SYSTEM

CROSS REFERENCES TO RELATED APPLICATIONS

The present application claims priority to Japanese Priority Patent Application JP 2011-075764 filed in the Japan Patent Office on Mar. 30, 2011, the entire content of which is hereby incorporated by reference.

BACKGROUND

The present disclosure relates to a control apparatus, a control method, a program and a system.

In recent years, sensors have been mounted in various household products with the miniaturization and price reduction of sensor devices. For example, an illuminance sensor is mounted in an image display device in order to control the brightness of a backlight depending on the surrounding brightness. In addition, a motion sensor is mounted in an air conditioner in order to detect a person's location and adjust the airflow rate and the air direction thereof.

These sensor devices are mounted in order to realize functions of the device main body such as the adjustment of a backlight of an image display device or the adjustment of the airflow rate and the air direction of an air conditioner. However, in the future, systems may be proposed which are capable of providing a more convenient and safer life to a user by connecting a device in which a sensor is mounted to another device, and notifying another device of its own sensor information.

For example, Japanese Registered Utility Model No. 3136714 discloses that even when the device main body is in a halting state, sensor information detected from a sensor included in a device is specially used by notifying another device of the sensor information.

In addition, Japanese Unexamined Patent Application Publication No. 2009-206750 discloses that when sensor information received from a plurality of sensors is displayed on a plurality of display devices, a program for converting the corresponding sensor information into a format capable of being displayed is selected in each of the display devices. In addition, Japanese Unexamined Patent Application Publication No. 2009-206750 discloses a program for adapting a motion of a pseudo-character displayed on the display device on the basis of the sensor information to a motion of a sensor information sender so that the sensor information can be confirmed as a motion of the sensor information sender in each of the display devices.

SUMMARY

However, Japanese Registered Utility Model No. 3136714 discloses a technique for specially using a piece of sensor information, but does not disclose the use of the sensor information from a plurality of sensors at all. In addition, the special use of the sensor information disclosed in Japanese Registered Utility Model No. 3136714 is a process which is set in advance, and is not able to be freely customized by a user.

In addition, Japanese Unexamined Patent Application Publication No. 2009-206750 discloses a display of each sensor's information as the special use of the sensor information, but does not disclose determination of a control for another device on the basis of values or combination of the sensor information. In addition, the selected program is set in advance, and is not able to be freely customized by a user.

Consequently, it is desirable to provide a novel and modified control apparatus, a control method, a program and a control system which are capable of setting control of a device according to sensor information by a user, and capable of making user's life more comfortable.

According to an embodiment of the present disclosure, there is provided a control apparatus including: a determination section that determines a control command according to sensor information, on the basis of a control rule capable of being set by a user for determining the control command controlling a device; and a control section that controls the device in accordance with the control command determined by the determination section.

In addition, according to another embodiment of the present disclosure, there is provided a control method including: storing a control rule capable of being set by a user for determining a control command controlling a device in a storage section; determining the control command according to sensor information on the basis of the control rule stored in the storage section; and controlling the device in accordance with the control command determined by the determination section.

In addition, according to another embodiment of the present disclosure, there is provided a program that causes a computer to execute: a process of storing a control rule capable of being set by a user for determining a control command controlling a device in a storage section; a process of determining the control command according to sensor information on the basis of the control rule stored in the storage section; and a process of controlling the device in accordance with the control command determined by the determination section.

In addition, according to another embodiment of the present disclosure, there is provided a control system including: a sensor; and a control apparatus including a determination section that determines a control command according to sensor information received from the sensor, on the basis of a control rule capable of being set by a user for determining the control command controlling a device, and a control section that controls the device in accordance with the control command determined by the determination section.

According to the embodiments of the present disclosure as described above, it is possible to set a control of a device according to sensor information by a user, and to make user's life more comfortable.

Additional features and advantages are described herein, and will be apparent from the following Detailed Description and the figures.

BRIEF DESCRIPTION OF THE FIGURES

FIG. 3 is a diagram illustrating an example of a data structure of sensor device information according to the first embodiment of the present disclosure.

FIG. 4 is a diagram illustrating an example of the data structure of sensor information according to first embodiment of the present disclosure.

FIG. 5 is a diagram illustrating an example the data structure of a control rule according to first embodiment of the present disclosure.

FIG. 8 is a diagram illustrating an example of thresholds of the control rule module according to the first embodiment of the present disclosure.

FIG. 9 is a diagram illustrating an example of a control command according to the embodiment of the present disclosure.

DETAILED DESCRIPTION

Hereinafter, reference will be made to the accompanying drawings to describe preferred embodiment of the present disclosure in detail. Meanwhile, in the specification and the drawings, components having substantially the same functional configuration are assigned the same reference signs, and the description thereof will be omitted.

Figure 1:
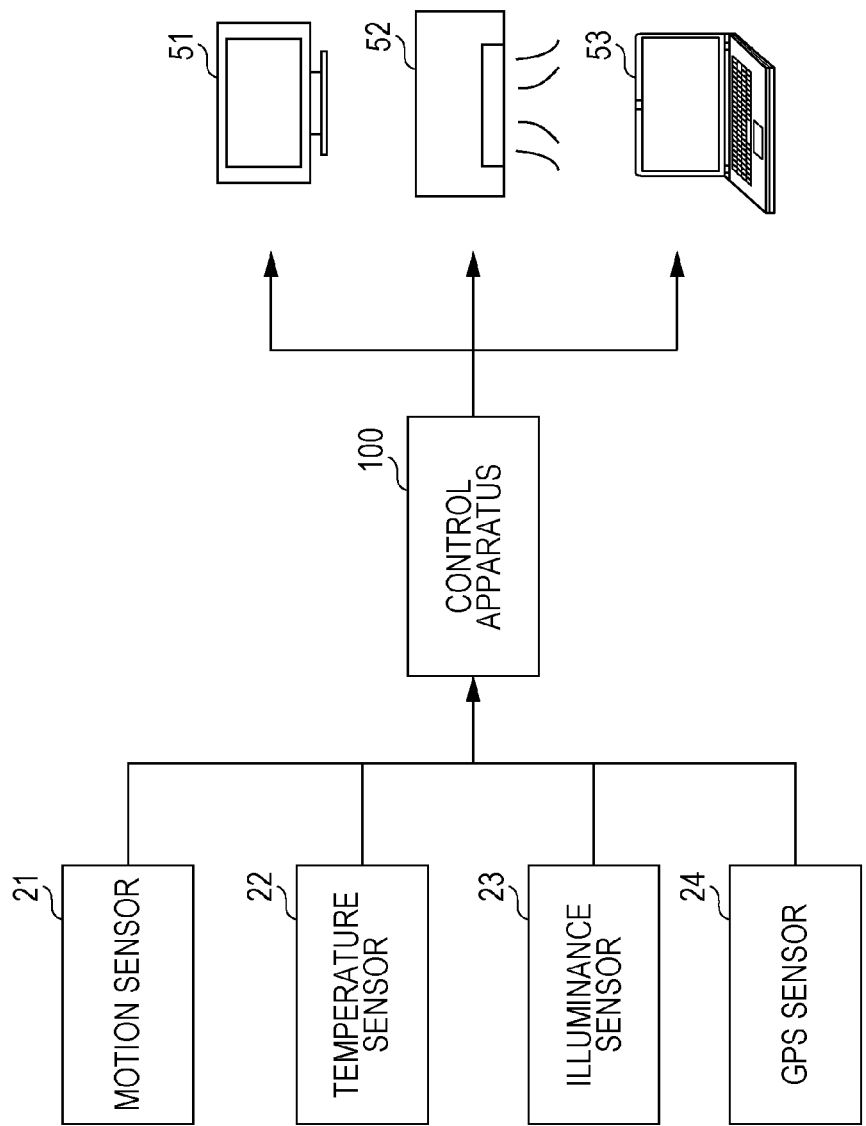
FIG. 1 is an overall diagram illustrating a control system according to a first embodiment of the present disclosure.

Meanwhile, the description will be made in the following order.
1. Outline of Control System According to First Embodiment
2. Detailed Description of Control System According to First Embodiment
(2-1) Configuration of Control Apparatus
(2-2) Configuration of Control Rule
(2-3) Setting of Control Rule
(2-4) Control Process
3. Control System According to Second Embodiment
4. Conclusion 1. Outline of Control System According to First Embodiment First, an outline of a control system according to a first embodiment of the present disclosure will be described. The control system according to the embodiment is composed of various types of sensors, devices to be controlled, and a control apparatus 100, and various types of sensors and the devices to be controlled are connected to the control apparatus 100. For example, as shown in FIG. 1, as various types of sensors, a motion sensor 21, a temperature sensor 22, an illuminance sensor 23, and a GPS sensor 24 are connected to the control apparatus 100, and as the devices to be controlled, an image display device 51, an air conditioner 52, and a computer 53 are connected to the control apparatus 100.

Herein, various types of sensors may be provided independently of other devices, and may be mounted in other devices for providing other functions. For example, various types of sensors may be a motion sensor mounted in the image display device 51, and may be a temperature sensor mounted in the air conditioner 52.

In addition, various types of sensors, the devices to be controlled and the control apparatus 100 are connected to each other by networks such as, for example, Ethernet, WiFi, Bluetooth, ZigBee, and PLC (PowerLine Communications), or a combination thereof.

The control apparatus 100 according to the embodiment acquires sensor information detected by various types of sensors, and determines a control command according to the acquired sensor information, on the basis of a control rule which is set in advance. Next, the control apparatus 100 performs controls of devices such as an ON/OFF control of the image display device 51 connected to the control apparatus 100, a temperature level adjustment control of the air conditioner 52, and an email transmission control through the computer 53, in accordance with the determined control command.

In this manner, the control system according to the embodiment controls the devices in accordance with a plurality of sensor information items, thereby allowing a user's life to be made comfortable. In addition, the control rule can be created or changed at a user's discretion, and thus it is possible to freely customize the control of the device according to the sensor information, and to make a user's life more comfortable.

Meanwhile, the control apparatus 100 according to the embodiment may be disposed on a home network. Since the home network is a communication network that connects various types of sensors and devices installed within a home, the control apparatus 100 is able to acquire sensor information from various types of sensors through the home network, and control the devices. Further, a communication device for connecting the Internet may be provided on the home network, to acquire sensor information from a sensor located outside the home network. The sensor located outside the home network may be a GPS sensor provided in a portable terminal device such as a cellular phone, a PDA (Personal Digital Assistant), or a handheld game machine.

2. Detailed Description of Control System According to First Embodiment

Next, reference will be made to the drawings to describe the control system according to the first embodiment of the present disclosure in detail.

[2-1. Configuration of Control Apparatus]

Figure 2:
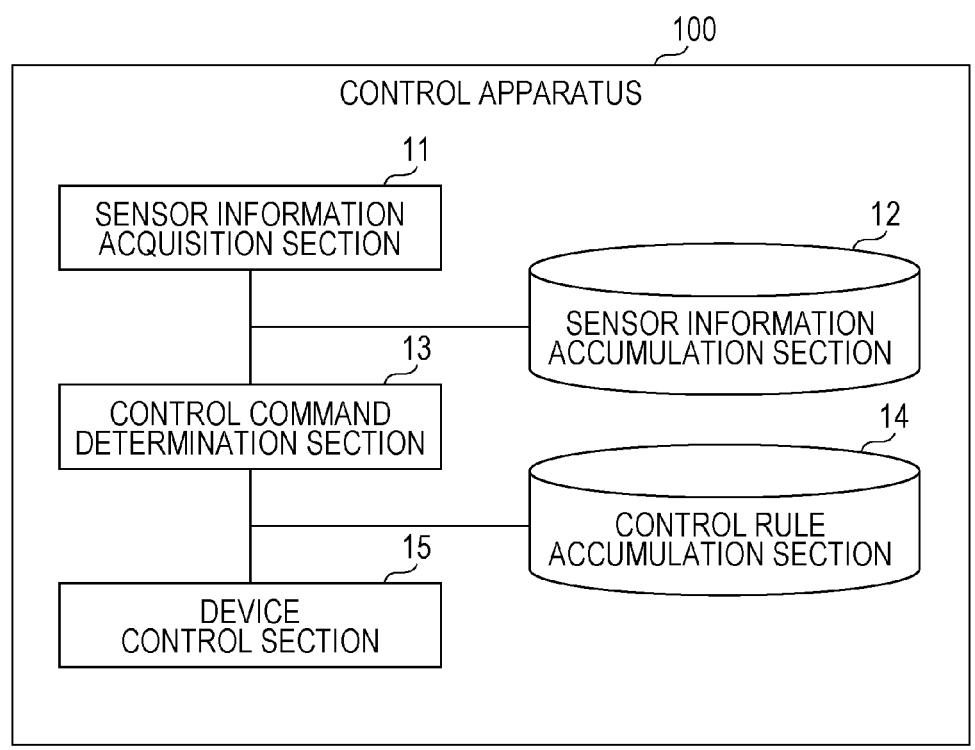
FIG. 2 is a block configuration diagram illustrating a control apparatus according to the first embodiment of the present disclosure.

First, the configuration of the control apparatus 100 will be described with reference to FIG. 2. As shown in FIG. 2, the control apparatus 100 includes a sensor information acquisition section 11, a sensor information accumulation section 12, a control command determination section 13, a control rule accumulation section 14 and a device control section 15.

The sensor information acquisition section 11 acquires sensor information and sensor device information from various types of sensors. For example, the sensor information acquisition section 11 acquires information on the presence or absence of a person from the motion sensor 21, temperature information from the temperature sensor 22, illuminance information from the illuminance sensor 23, and latitude/longitude/altitude information from the GPS sensor, as sensor information.

The sensor information accumulation section 12 is a recording medium that accumulates the sensor information and the sensor device information acquired by the sensor information acquisition section 11. The sensor device information is information indicating attributes of a sensor device such as the type, the output contents, and the installation location of the sensor device. In addition, the sensor information is information indicating a detection result by various types of sensors. Hereinafter, specific configurations of the sensor device information and the sensor information will be described with reference to FIGS. 3 and 4.

(Sensor Device Information)

FIG. 3 is a diagram illustrating a specific data structure example of the sensor device information. As shown in FIG. 3, the data structure of the sensor device information is composed of an ID, a type, an output, a unit, a device name, a location, and an active state. Herein, the ID is a unique ID (sensor ID) for managing the sensor device information in the sensor information accumulation section 12. The type is a type of the sensor. The output is content indicating a value output by the sensor. The unit is a unit of the value output by the sensor. The device name is a name of the device in which the sensor is mounted, or a name of the sensor device itself. The location is a location at which the device is placed. The active state means discovery/separation (true/false) of the sensor. For example, the sensor device information of which the ID is "S001" indicates that the type is "motion sensor", the output is "the presence or absence of a person", the unit is "-(none)", the device name is "TV", the location is "living room", and the active state is "true".

Meanwhile, the type, the output, the unit, and the device name in the data structure are invariable parameters for each sensor device. These invariable parameters may be previously registered with the sensor device, and may be registered with a server on the network. The control apparatus 100 may acquire these invariable parameters from the sensor device, and may acquire the invariable parameters from a server on the basis of the model number or the like incorporated in the sensor device.

In addition, the information on the location is information for easily identifying each of the sensors, but may be omitted. However, when there are a plurality of identical device names, each of the devices can be identified by the location information, and thus the location information is preferably included in the data structure and accumulated. For example, in a home provided with a plurality of TVs (televisions), it is difficult to identify whether it is a TV in a living room or a TV in a study room, just by the device name "TV", and thus it is preferable that the location information is input by a user.

In addition, the separation of the sensor can be detected by notifying the control apparatus 100 of the separation by the sensor, when a power supply of the sensor is turned off or when the connection to the control apparatus 100 is blocked. Otherwise, when the control apparatus 100 makes an inquiry from the home network, and the sensor discovered at the time of a previous inquiry is not discovered, the separation can be determined.

(Sensor Information)

Next, sensor information accumulated in the sensor information accumulation section 12 will be described with reference to FIG. 4. FIG. 4 is a diagram illustrating a specific data structure example of sensor information. As shown in FIG. 4, the data structure of the sensor information is composed of an ID, a sensor ID, a timestamp and a value. Herein, the ID is a unique ID (sensor information ID) for managing the sensor information in the sensor information accumulation section 12, the sensor ID is an ID (sensor ID) of the sensor in which the corresponding sensor information is detected, the Timestamp is a detected time and date, the value is a detected numerical value. For example, the sensor information of which the ID is "D001" indicates that the sensor ID is "S001", that is, a motion sensor of a TV placed in a living room when referring to the sensor device information shown in FIG. 3, the Timestamp is "2010/10/12 08:03:00", and the value is "1".

Meanwhile, the acquired sensor information is accumulated as time-series data on the basis of the Timestamp, and thus the sensor information can be displayed as a graph or displayed as statistical data. In addition, in the control apparatus 100, when only the latest data is necessary, data in which the sensor ID is identical and the timestamp is obsolete may be deleted from the sensor information accumulation section 12.

Herein, the description of the configuration of the control apparatus 100 is repeated with reference to FIG. 2. The control rule accumulation section 14 constituting the control apparatus 100 shown in FIG. 2 is a recording medium that accumulates the control rule for determining the control command. The detailed description of the control rule will be made in "2-2. Configuration of Control Rule".

The control command determination section 13 determines the control command on the basis of the sensor information accumulated in the sensor information accumulation section 12, and the control rule accumulated in the control rule accumulation section 14.

The device control section 15 controls each of the devices by outputting the control command determined in the control command determination section 13 to the devices to be controlled.

[2-2. Configuration of Control Rule]

Next, the control rule will be described. The control rule is a rule for determining the control command according to the sensor information.

FIG. 5 is a diagram illustrating the specific data structure of the control rule. The control rule is composed of a plurality of element rules, and each of the element rules specifies a logical connection relationship (input and output relationship) of the sensor, the control rule module, the control command and the like. More specifically, each of the element rules includes an ID, a rule ID, From, and To, as shown in FIG. 5.

The ID (identification) is an ID for uniquely identifying each of the element rules. The rule ID is an identifier of the control rule to which the element rule belongs. It is known that, for example, the element rules "C001" to "C007" shown in FIG. 5 are associated with the rule ID "R001", and thus these element rules belong to the control rule of which the rule ID is "R001".

In addition, From indicates an input source of data, and To indicates an output destination of data. For example, the element rule "C001" belonging to the control rule "R001" shown in FIG. 5 specifies the control rule module "M001" as a data output destination of the sensor "S006".

Figure 6:
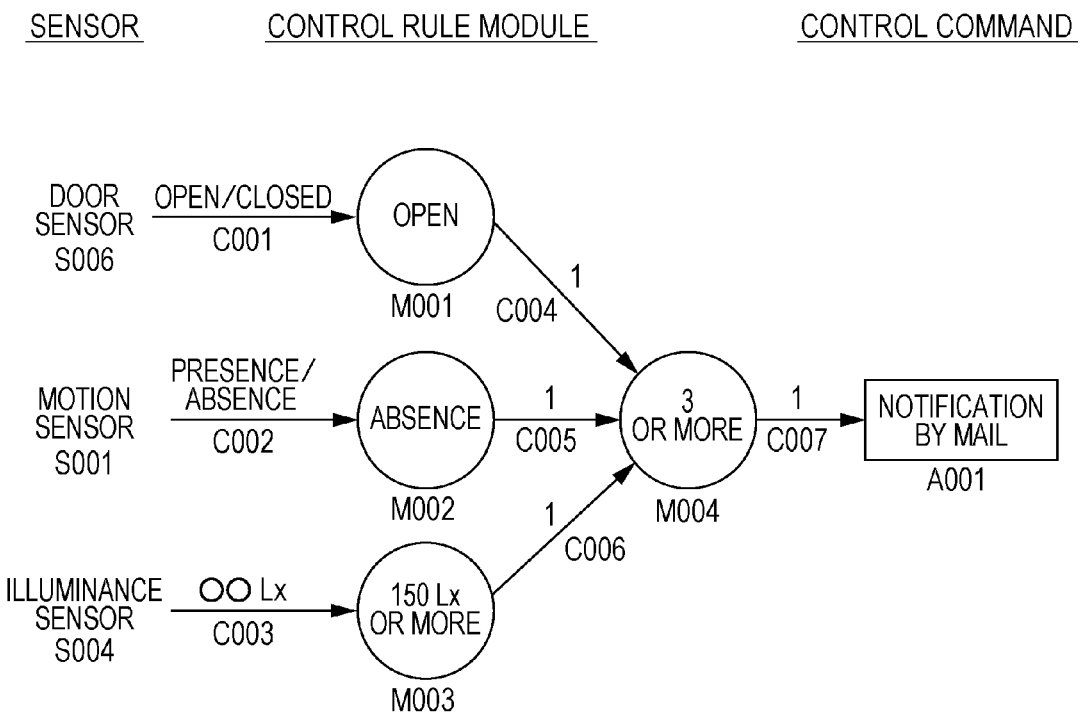
FIG. 6 is a conceptual diagram illustrating an example of the control rule according to the first embodiment of the present disclosure.

FIG. 6 shows a diagram in which the IDs and the like of the element rules are added to a conceptual diagram of the control rule having the data structure mentioned above. As shown in FIG. 6, the sensor, the control rule module and the control command are logically connected to each other by each of the element rules constituting the control rule. Hereinafter, the sensor, the control rule module and the control command will be respectively described.

(Sensor)

The sensors are various types of sensors that actually measure the surrounding environment. FIG. 6 shows a door sensor of which the sensor ID is "S006", a motion sensor of which the sensor ID is "S001", and an illuminance sensor of which the sensor ID is "S004".

(Control Rule Module)

The control rule module determines a value based on one or two or more input values in accordance with a predetermined rule, and outputs the determined value. For example, each control rule module has a threshold, and outputs a value based on the input value and the threshold. As such control rule modules, FIG. 6 shows the control rule module "M001" that outputs a value based on the input value from the door sensor, the control rule module "M002" that outputs a value based on the input value from the motion sensor, the control rule module "M003" that outputs a value based on the input value from the illuminance sensor, and the control rule module "M004" that outputs a value based on the input values from the control rule modules "M001" to "M003".

Figure 7:
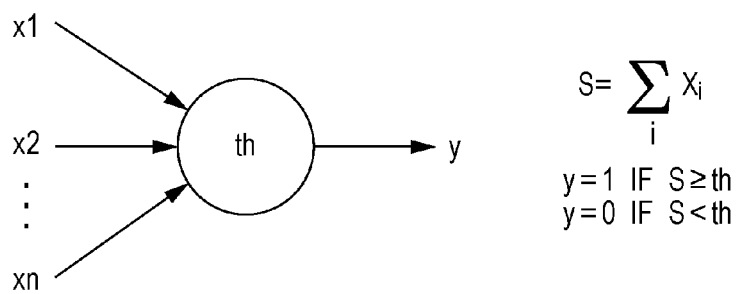
FIG. 7 is a conceptual diagram illustrating an example of a control rule module according to the first embodiment of the present disclosure.

Herein, FIG. 7 shows an example of the conceptual diagram of the control rule module. The control rule module shown in FIG. 7 outputs one output value (y) with respect to a plurality of input values (x1, x2, . . . , xn). In addition, the control rule module shown in FIG. 7 calculates the total sum of the input values, and determines whether the total sum of the input values is larger than a certain threshold (th). The control rule module outputs 1 when the total sum of the input values is th or more, and outputs 0 when the total sum thereof is less than th.

It is possible to realize more complex control rule modules by connecting such control rule modules to each other in a multiple-stage manner as shown in FIG. 6.

The data structure of the above-mentioned control rule module will be described with reference to FIG. 8. FIG. 8 is a diagram illustrating the specific data structure of the control rule module. The control rule module includes an ID and a threshold as shown in FIG. 8. Herein, the ID is a unique ID (module ID) for managing the control rule module. The threshold indicates a predetermined rule for outputting a value based on the input value in each of the control rule modules. For example, the control rule module of which the ID shown in FIG. 8 is "M001" corresponds to the threshold of "S==1", and thus outputs a value based on whether the total sum of the input values is 1. Specifically, the control rule module outputs 1 when the total sum of the input values is 1, and outputs 0 when the total sum thereof is other than 1. Meanwhile, all the values input from the sensor are expressed as numeric data. For example, "open/close" indicating the output value of the door sensor S006 shown in FIG. 6 are respectively expressed by "1/0", and "presence/absence" indicating the output value of the motion sensor S004 are respectively expressed by "1/0".

(Control Command)

The control commands are various types of control commands for controlling the device indicated by the command ID (A001). The data structure of the control command will be described with reference to FIG. 9. FIG. 9 is a diagram illustrating an example of the data structure of the control command. As shown in FIG. 9, the data structure of the control command is composed of an ID and an action. Herein, the ID is a unique ID for managing the control command. In addition, the action indicates the content of the control. For example, the control command of which the ID is "A001" indicates that the action is "notification by email".

[2-3. Setting of Control Rule]

Figure 10:
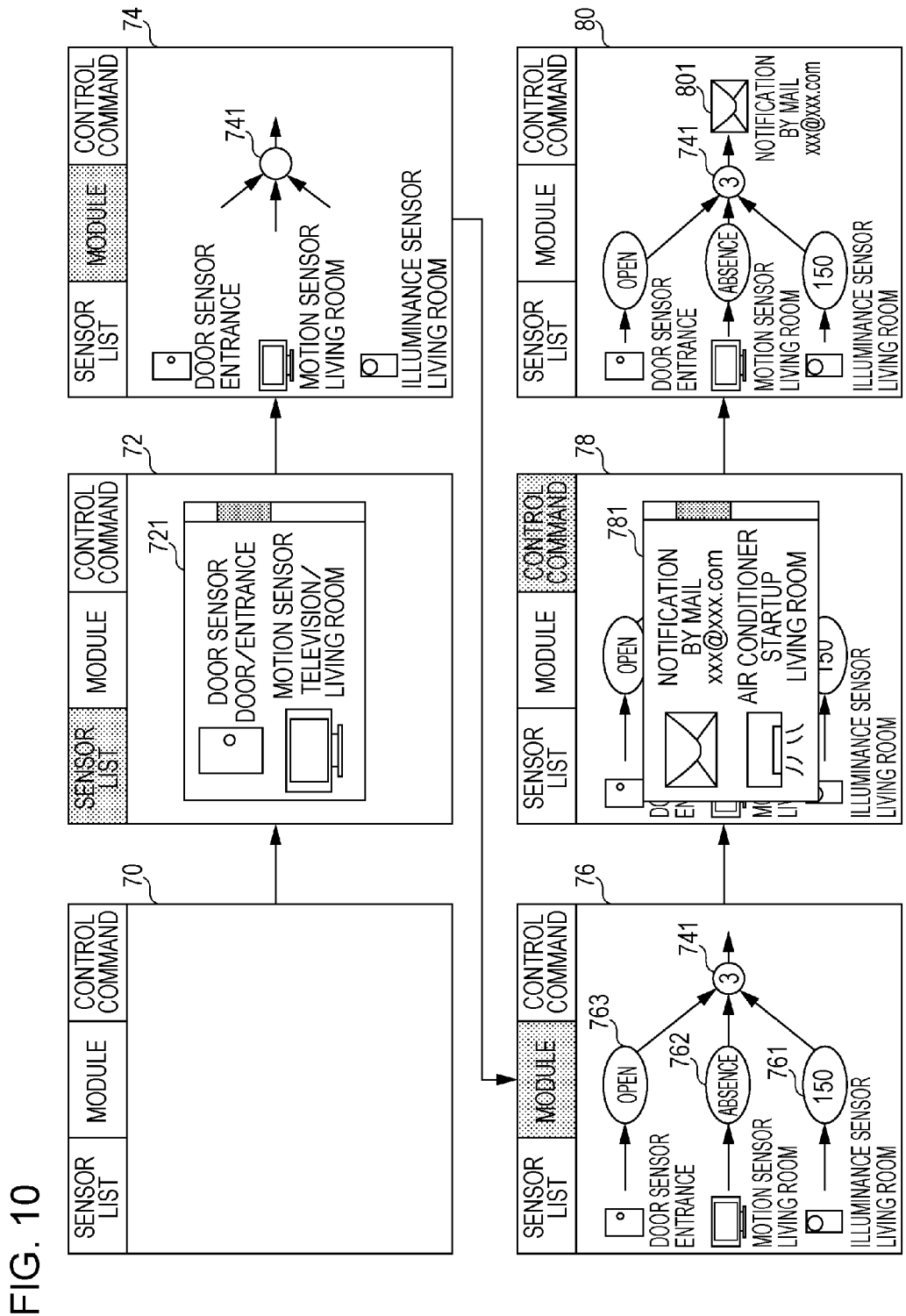
FIG. 10 is a diagram illustrating a screen display example at the time of creating the control rule according to the embodiment of the present disclosure.

The above-mentioned control rule may be set by new create or change by a user. Reference will be made to FIG. 10 to describe a GUI (Graphical User Interface) for allowing a user to create the control rule. Meanwhile, such a display control of the GUI may be performed by the device control section 15 of the control apparatus 100 (display control section).

FIG. 10 is a diagram illustrating a screen transition of a GUI for allowing a user to create the control rule. The application executing such a control rule creation GUI may be a PC application, and may be a Web application operating on the browser. Herein, in the course of the control rule creation, a list of various types of sensors that send the sensor information to the control apparatus 100 is displayed, or the created control rule is accumulated. Therefore, the device executing each of the applications mentioned above is preferably a device having a configuration which communicates with the control apparatus 100, or a device which is integral with the control apparatus 100.

a. New Control Rule Creation

A screen 70 shown in FIG. 10 is a creation screen of a new control rule. Three menus of "sensor list", "module" and "control command" are displayed on the screen 70.

b. Sensor Selection

First, a user selects "sensor list" from the menus displayed on the screen 70. When "sensor list" is selected, a sensor list 721 capable of being used by a user is displayed as shown on the screen 72. The sensor list 721 is generated on the basis of the sensor device information accumulated in the sensor information accumulation section 12 of the control apparatus 100. In this case, as icons indicating various types of sensors displayed on the sensor list 721, icons based on the device name of the sensor device information are displayed, thereby allowing discriminability of the device to be enhanced. In addition, an icon which is registered in advance by a user may be displayed. When an icon is selected from the sensor list 721 by a user, the icon indicating the selected sensor is displayed on the screen 74.

c. Module Addition 1

Next, "module" is selected from the menu. When "module" is selected, an icon 741 indicating the control rule module is displayed as shown on the screen 74. A user associates the control rule module with an arbitrary sensor of the sensors displayed on the screen 74. For example, when the user drags and drops a mouse from the sensor to the control rule module, an arrow is displayed between the sensor and the control rule module, thereby allowing both of them to be associated with each other. In addition, the type of the select control rule module can be selected. The selection of the type of the control rule module will be described in the following "d. Module Addition 2".

d. Module Addition 2

A user further selects "module" from the menu, thereby allowing the control rule module to be easily added. For example, as shown on a screen 76 of FIG. 10, control rule modules 761 to 763 are added, and each of the sensor and the control rule module 741 are associated with each other. In this way, the control rule modules are associated with each other in a multiple-stage manner, thereby allowing more complex control rule modules to be realized.

Herein, the selection of the type of the select control rule module will be described. It is possible to select control rule modules, for example, shown in FIGS. 11 and 12 in addition to the control rule module shown in FIG. 7. Each of the control rule modules will be described below.

Figure 11:
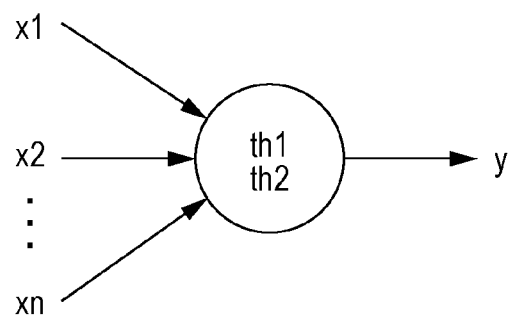
FIG. 11 is a conceptual diagram illustrating an example of the control rule module according to the first embodiment of the present disclosure.

The control rule module shown in FIG. 7 has one threshold, but the control rule module shown in FIG. 11 has two thresholds, or th1 and th2. That is, the control rule module shown in FIG. 11 outputs one output value (y) with respect to a plurality of input values (x1, x2, . . . , xn). In addition, the control rule module shown in FIG. 11 calculates the sum of a plurality of input values (x1, x2, . . . , xn), and determines whether the total sum of the input values is equal to or more than th1 and less than th2, less than th1, or equal to or more than th2. When the total sum of the input values is equal to or more than th1 and less than th2, 1 is output. When the total sum of the input values is smaller than th1 or equal to or more than th2, 0 is output.

Figure 12:
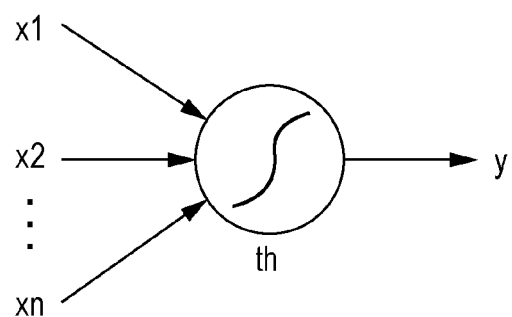
FIG. 12 is a conceptual diagram illustrating an example of the control rule module according to the first embodiment of the present disclosure.

The threshold (evaluation function) of the control rule module shown in FIG. 12 is a sigmoid function. That is, in the control rule module shown in FIG. 12, y is output in accordance with the expression shown in the diagram on the right of FIG. 12. In this manner, while the output value y of the above-mentioned expression shown in FIG. 7 or 11 is set to two value of 0 or 1, the output value y of the expression shown in FIG. 12 is set to a continuous value from 0 to 1.

Next, a user sets thresholds of each of the control rule modules. For example, the thresholds as shown in FIG. 8 are set to each of the control rule modules.

In this case, the threshold which is easily comprehended by a user may be displayed in accordance with the output contents of the connected sensor. For example, when the door sensor is associated with the control rule module, the numerical value is input from the door sensor, but "open" or "closed" can be selected on the screen 76 in accordance with the output of the door sensor shown in FIG. 3.

e. Control Command Addition

Next, "control command" is selected from the menu. When "control command" is selected, a control command list capable of being selected by a user is displayed. For example, as shown in a screen 78 of FIG. 10, a control command list 781 is displayed. The control command instructs operations, capable of being executed by the device to be controlled, such as a startup operation of the air conditioner and an ON/OFF operation of the TV. The device to be controlled receiving the control command discovered in advance by the control apparatus 100, and is registered. When a user selects an icon from the control command list 781, an icon 801 of the selected control command is displayed on the screen. Herein, information necessary to the control command may be input. For example, when the control command of "notification by email" is selected, an email address of a notification destination is input.

f. Control Rule Accumulation

Subsequently, a user associates the icon of the control command displayed on the screen with the control module. For example, when the user drags and drops a mouse from the control rule module 741 to the icon 801 of the control command, the control rule module 741 and the icon 801 of the control command are connected to each other by an arrow as shown on a screen 80 of FIG. 10, thereby allowing the control rule module and the control command to be associated with each other. The control rule created in this manner is accumulated in the control rule accumulation section 14.

In addition, the order in which the control rule is newly created in accordance with the screen shown in FIG. 10 has been described in the above-mentioned example. On the other hand, when the control rule accumulated in the control rule accumulation section 14 is changed, addition, deletion or change of the arrows indicating addition, deletion or association of the sensor, the module, and the control command is performed on the control rule shown on the screen 80. Thereby, a user is able to freely customize the control rule using the GUI.

As described above, the user freely performs the creation and the change of the control rule, thereby allowing the control rule to be set. Meanwhile, the control apparatus 100 includes a communication section that transmits and receives the control rule to and from another control apparatus, thereby allowing a user to use the control rule created by another user by quotation or change thereof. In addition, the control rule accumulation section shared with another control apparatus may be used through the above-mentioned communication section. Meanwhile, when a user does not want to share the control rule, accumulated in the above-mentioned shared control rule accumulation section, created by user's self with another user, the user may not open the control rule to another user by setting the right of access to such a control rule.

[2-4. Control Process]

Next, the procedure of the control apparatus 100 will be described with reference to a flow diagram shown in FIG. 13. Herein, the process in the control apparatus 100 shown in FIG. 1 is described, but the same is true of a process in a control apparatus 101 shown in FIG. 15.

First, in step S301, the control apparatus 100 discovers and separates a sensor connected to the control apparatus 100. In the discovery of the sensor, the sensor notifies the control apparatus 100 of the connection, for example, when the sensor is connected to the control apparatus 100, thereby allowing the control apparatus 100 to discover the sensor. Otherwise, the control apparatus 100 makes an inquiry periodically, and whether the sensor is connected may be confirmed.

Next, the sensor information acquisition section 11 of the control apparatus 100 acquires the sensor device information (see FIG. 3) of the discovered sensor, and accumulates in the sensor information accumulation section 12. In addition, "active" of the data structure of the sensor device information of the discovered sensor is set to "true". On the other hand, when the sensor is separated (when the sensor previously discovered is not discovered), "active" of the data structure of the sensor device information is set to "false".

Next, in step S302, the sensor information acquisition section 11 acquires the sensor information (see FIG. 4) from the discovered sensor. In the acquisition of the sensor information, the sensor information may be periodically transmitted from each of the sensors, and the sensor information may be periodically inquired of each of sensors from the sensor information acquisition section 11.

Sensor collection acquired from each of the sensors is accumulated in the sensor information accumulation section 12 similarly to the sensor device information.

Next, in step S303, the control command determination section 15 acquires the control rule matching the sensor information accumulated in the sensor information accumulation section 12, from the control rule accumulation section 14. The control rule matching the sensor information is a control rule in which "active" of the sensor device information is "true", relating to a sensor having "timestamp" within x seconds (for example, within 60 seconds) from the current time. The sensor having "timestamp" within x seconds from the current time is targeted, thereby allowing obsolete sensor information to be excluded. Alternatively, when the sensor information acquisition section 11 acquires the sensor information at the time of the change in the numerical value detected by the sensor, and accumulates the sensor information having a latest timestamp in the sensor information accumulation section 12, the sensor information accumulated in the sensor information accumulation section 12 may be targeted regardless of the current time.

For example, when the current time is 2010/10/12 08:05:00, and the sensor device information shown in FIG. 3 and the sensor information shown in FIG. 4 are referenced, it is known that the sensors, in which "active" of the sensor device information is "true", having "timestamp" within 60 seconds from the current time are the motion sensor S001, the illuminance sensor S004 and the door sensor S006. Therefore, the control command determination section 13 acquires the control rule relating to the motion sensor S001, the illuminance sensor S004 and the door sensor S006 from the control rule accumulation section 12.

Next, in step S304, whether to establish the relationship of all the control rules is determined from the control rule relating to each of the above-mentioned sensors. For example, when the values of the door sensor, the motion sensor and the illuminance sensor are input as in a control rule shown in FIG. 14, whether a control rule capable of determining the control command can be established is determined. Meanwhile, the data structure of the control rule shown in FIG. 14 is the data structure shown in FIG. 5, and the diagram in which a conceptual diagram such a control rule is added to the ID of the data structure is as shown in FIG. 6.

Next, when the control rule can be established in step S304 mentioned above, in step S305, the control command determination section 13 determinates the control command on the basis of the established control rule. Hereinafter, the determination of the control command based on the control rule will be described with reference to the control rule exemplified in FIG. 14.

The control command determination section 13 inputs the sensor information of the door sensor to the control rule module, and determines "open/close". In the case of "open", "1" is output. Similarly, the control command determination section inputs the sensor information of the motion sensor to the control rule module, and determines "presence/absence". In the case of "absence", "1" is output. In addition, the sensor information of the illuminance sensor is input to the control rule module, and whether the input "numerical value (unit Lx) indicating brightness" is "150Lx or more" is determined by the control rule module. In the case of "150Lx or more", "1" is output.

Figure 14:
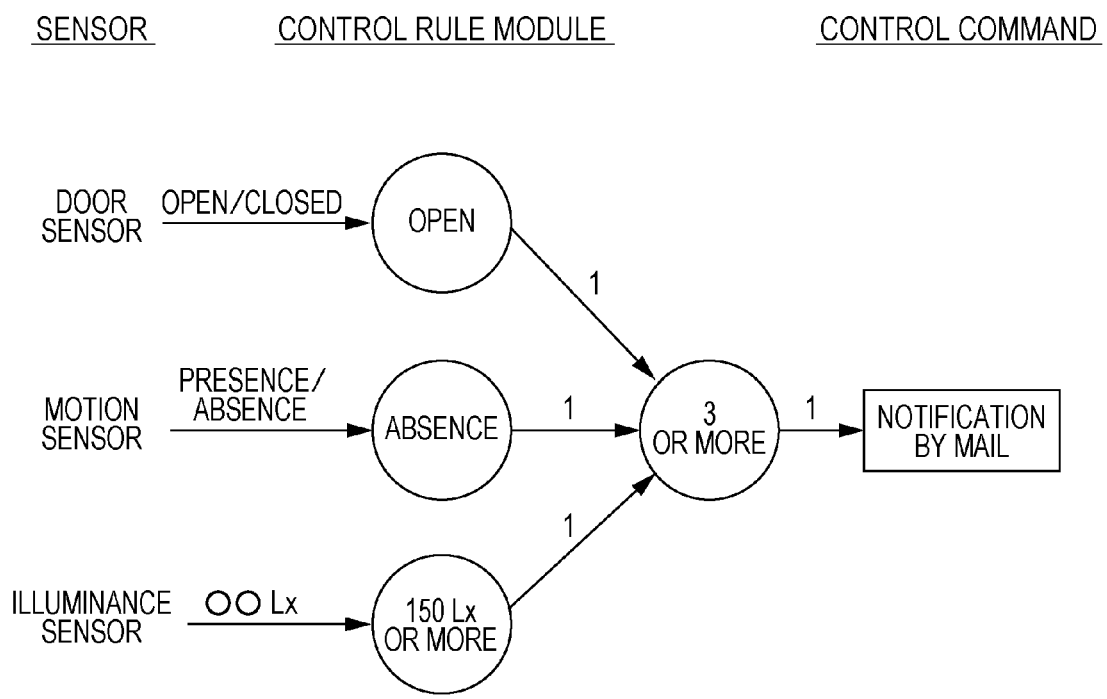
FIG. 14 is a diagram illustrating an example of the control rule according to the first embodiment of the present disclosure.

Herein, in the control rule shown in FIG. 14, the control rule module is composed of two stages. That is, of the control rule modules shown in FIG. 14, each control rule module which outputs a value based on the input value from various types of sensors is located at the former stage, and the control rule module which outputs a value based on the input value from each control rule module of the former stage is located at the latter stage.

The control rule module of the latter stage determines whether the total sum of the input values from each control rule module of the former stage is "3 or more". The control rule module of the latter stage outputs "1" when the of the total sum of the input values is "3 or more", and outputs "0" when the total sum thereof is other than "3 or more".

Subsequently, returning to FIG. 13, the description of step S306 is made. In step S306, the control command determination section 13 determines whether the output value obtained by the execution of the control rule in step S305 mentioned above is 1. When the output value is 1, the control command determination section 13 determines the control command to be present, and the process proceeds to step S307. On the other hand, when the output value is 0, the control command determination section determines the control command not to be present, and thus the process proceeds to step S308.

Next, in step S307, the device control section 15 executes the control command determined by the control command determination section 13. An example of the execution contents indicated by the control command is as shown in FIG. 9. According to the control command determined by the control rule shown in FIG. 14, the email notification is executed. As an execution method of the email notification, the device control section 15 may perform the control so as to cause a computer connected to the control apparatus 100 to transmit an email to an email address destination which is registered in advance, and the device control section 15 may transmit an email by itself to the email address destination which is registered in advance. In this manner, for example, when a person is not present in the living room in the case where the entrance door is opened, and the electric light in living room is turned on, it is possible to notify a user, by an email, to the effect that the electric light in the living room is turned on.

On the other hand, in step S308, whether to satisfy the termination conditions is determined. Returning to step S302 when the termination conditions are not satisfied, the process is terminated. The termination conditions correspond to a case where there are instructions from a user, a case where there are some errors, or the like.

3. Control System According to Second Embodiment

[3-1. Outline]

Next, a control system according to a second embodiment of the present disclosure will be described. The control apparatus 101 according to the embodiment is connected to a plurality of home networks through the Internet. For example, as shown in FIG. 15, a control system is proposed in which a sensor information transfer gateway 30 disposed in a home network 200, a sensor control gateway 40 disposed in a home network 500, and the control apparatus 101 are connected to each other through Internet 300.

Figure 15:
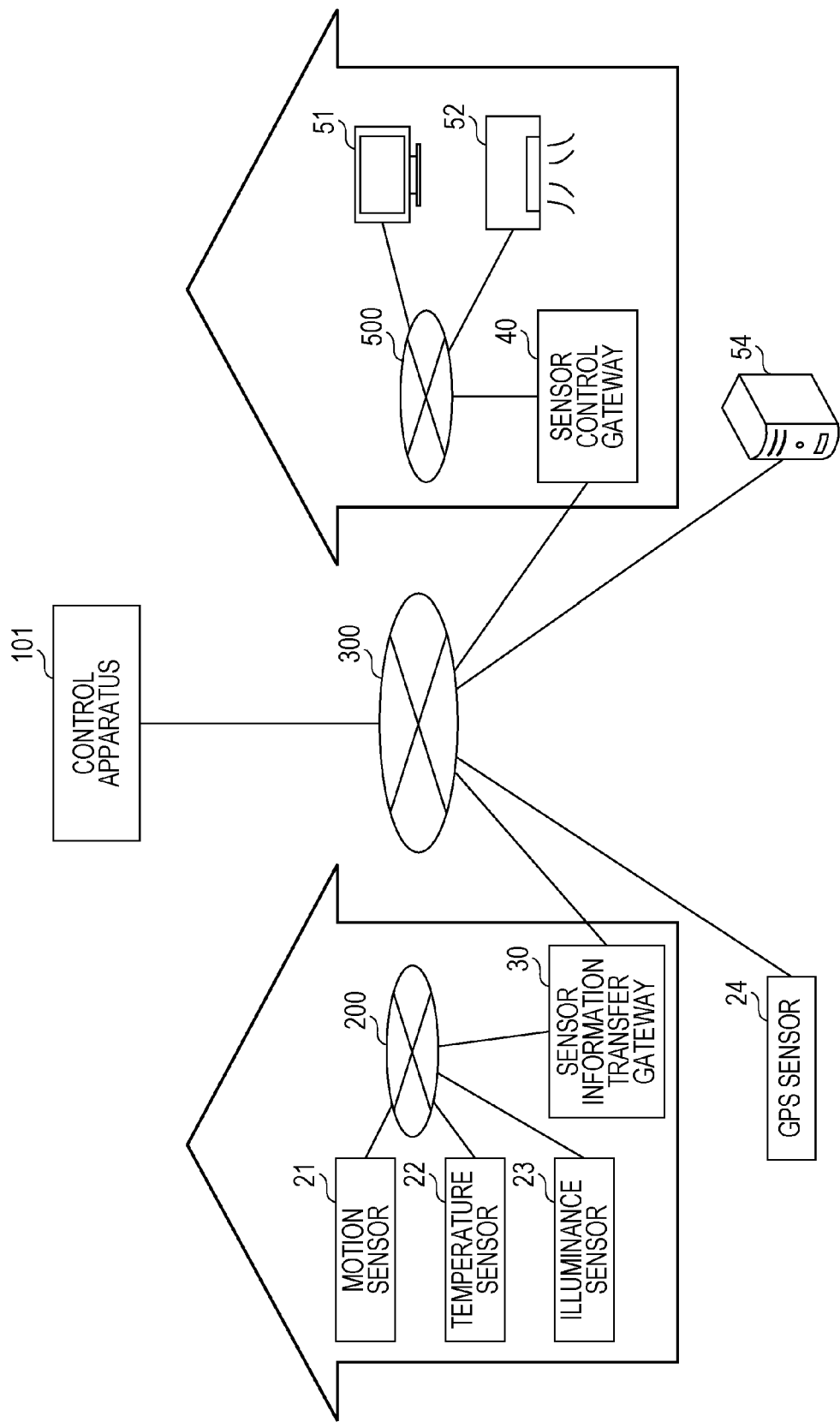
FIG. 15 is an overall diagram illustrating a control system according to a second embodiment of the present disclosure.

As shown in FIG. 15, the home network 200 is a domestic home network which is connected to the motion sensor 21, the temperature sensor 22, the illuminance sensor 23, and the sensor information transfer gateway 30.

As shown in FIG. 15, the home network 500 is a domestic home network which is connected to the image display device 51 which is ON/OFF-controlled, the device to be controlled such as the air conditioner 52 in which the temperature level adjustment control is performed, and the sensor control gateway 40.

Sensor information from the GPS sensor 24 mounted in a cellular phone terminal is transmitted to the control apparatus 101 through the Internet 300. In addition, the control apparatus 101 and a computer 54 are connected to each other through the Internet 300.

[3-2. Configuration]

Next, the configuration of each of the devices will be described with reference to FIG. 16. First, as shown in FIG. 16, the control apparatus 101 includes the sensor information acquisition section 11, the sensor information accumulation section 12, the control command determination section 13, the control rule accumulation section 14, the device control section 15 and a communication section 16.

The communication section 16 transmits the control command output from the device control section 15 to the device to be controlled through the Internet 300. Another configuration of the control apparatus 101 is the same as the configuration described in the first embodiment, and thus the detailed description herein will be omitted.

The control apparatus 101 having the above-mentioned configuration may directly transmit a control command, performing the separation from the home network, such as an email transmission command of the control commands to a device to be controlled without the sensor control gateway 500. For example, the control apparatus 101 transmits the email transmission command to the computer 54 having an email transmission function. Alternatively, the control apparatus 101 may execute the email transmission through the communication section 16 included in the control apparatus 101.

Figure 16:
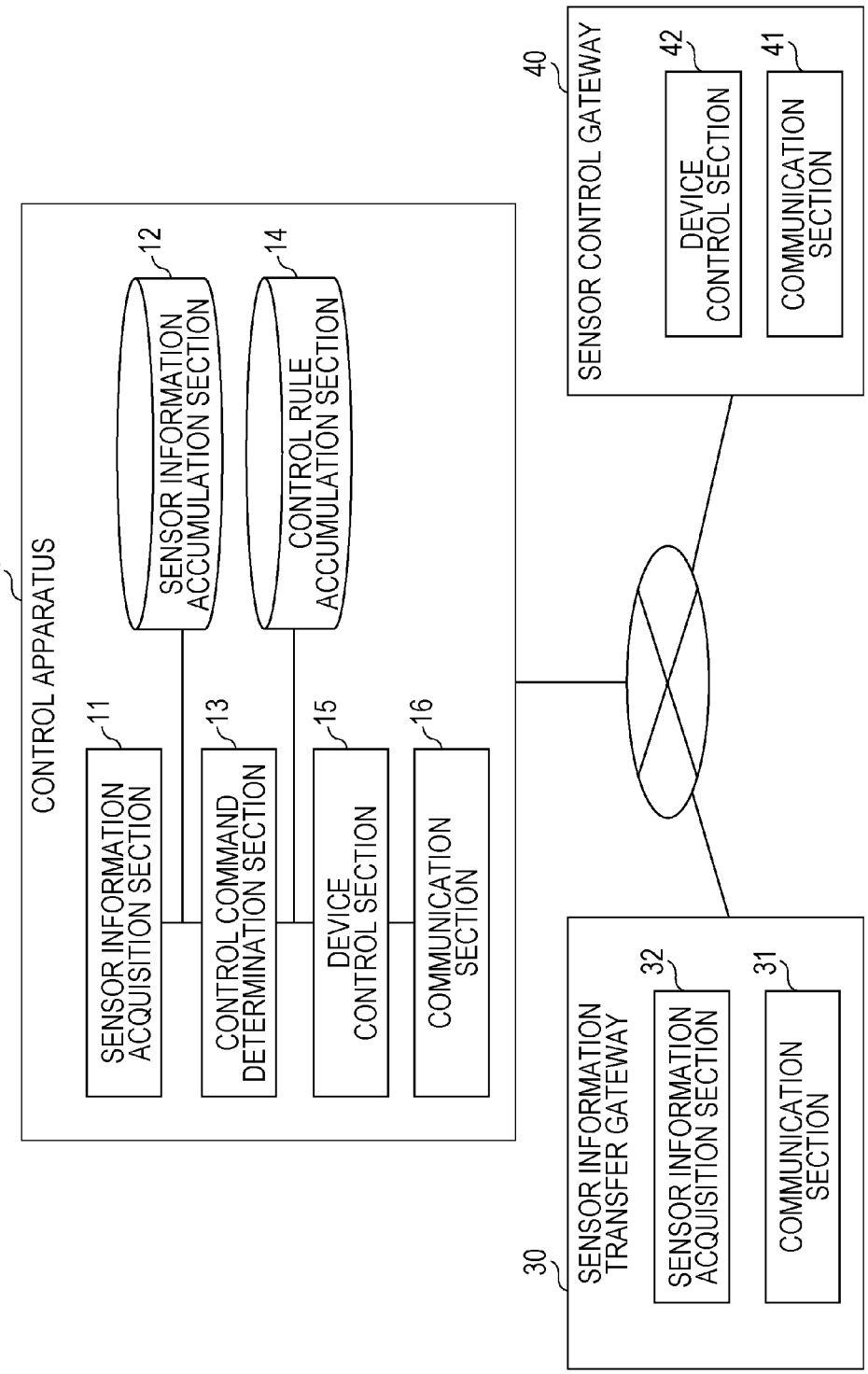
FIG. 16 is a block configuration diagram illustrating the control system according to the second embodiment of the present disclosure.

As shown in FIG. 16, the sensor information transfer gateway 30 includes a communication section 31 and a sensor information acquisition section 32.

The sensor information acquisition section 32 acquires sensor information from various types of sensors. The communication section 31 transmits the sensor information acquired by the sensor information acquisition section 32 to the control apparatus 101. The sensor information transfer gateway 30 may collectively transmit the sensor information acquired from various types of sensors to the control apparatus 101.

In addition, various types of sensors and the sensor information transfer gateway 30 on the home network 200 may be connected to each other through ZigBee which is a low-power-consumption near field wireless communication standard. In addition, the sensor information transfer gateway 30 and the control apparatus 101 on the Internet may be connected to each other through the Ethernet.

As shown in FIG. 16, the sensor control gateway 40 includes a communication section 41 and a device control section 42.

The communication section 41 receives a control command from the control apparatus 101. The device control section 42 sends the received control command to the device to be controlled. The sensor control gateway 40 and the control apparatus 101 on the Internet may be connected to each other through the Ethernet. In addition, the device to be controlled and the sensor control gateway 40 on the home network 500 may be connected to each other through ZigBee which is a low-power-consumption near field wireless communication standard.

In this manner, a plurality of home networks and the control apparatus 101 can communicate with each other through the Internet, and thus the control apparatus 101 can controls a device disposed on another home network in accordance with the sensor information of the sensor disposed on the home network. For example, it is possible to sense the living conditions of parents who live separately using the motion sensor and the like, and to monitor the conditions. In addition, the conditions of a remote location are sensed, thereby allowing alert notification to be performed when abnormality occurs.

Further, it is possible to have easy access to the control apparatus 101 from the outside of the home network by disposing the control apparatus 101 on the Internet. For example, it is possible to easily monitor the domestic conditions from the outside of a home through portable terminal devices such as a cellular phone and a smartphone.

4. Conclusion

As described above, according to the control system of the present disclosure, it is possible to collect sensor information from a sensor, and to determine a control command according to the acquired sensor information, on the basis of a control rule which is set in advance. In addition, since a user is able to freely create and change the control rule, it is possible to provide a control system for making a user's life more comfortable.

In addition, according to the control system of the present disclosure, the control rule can be composed of control rule modules which determine an output value on the basis of sensor information from one or more sensors. In addition, the control rule module can determine the output value by comparing the total sum of information from one or more sensors with a threshold which is set in advance. In addition, the control rule may be configured by the combination of the control rule modules in a multistage manner.

In addition, according to the control system of the present disclosure, the control apparatus may include a communication section for sharing the control rule with another user. Thereby, a user is able to use a control rule previously created by another user in the user's own environment only by selecting the control rule. In addition, it is possible to easily customize the control rule for user's self by changing the control rule created by another user.

In addition, a user is able to create an original control rule in a simple procedure by using a GUI for creating or changing the control rule.

In addition, in the control system according to the above-mentioned second embodiment, although the home network 200 connected to various types of sensors and the home network 500 connected to the devices to be controlled have been described as an example of a separate home network, the control system according to the present disclosure is not limited thereto. For example, various types of sensors and the devices to be controlled may be disposed on one home network. In this case, a gateway to be connected to the Internet is disposed on such a home network, and communication with the control apparatus on the Internet from the gateway is performed. Such a configuration of the gateway has a configuration of the sensor information transfer gateway 30 and a configuration of the sensor control gateway 40 mentioned above.

As stated above, although the preferred embodiments of the present disclosure have been described in detail with reference to the accompanying drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

Figure 13:
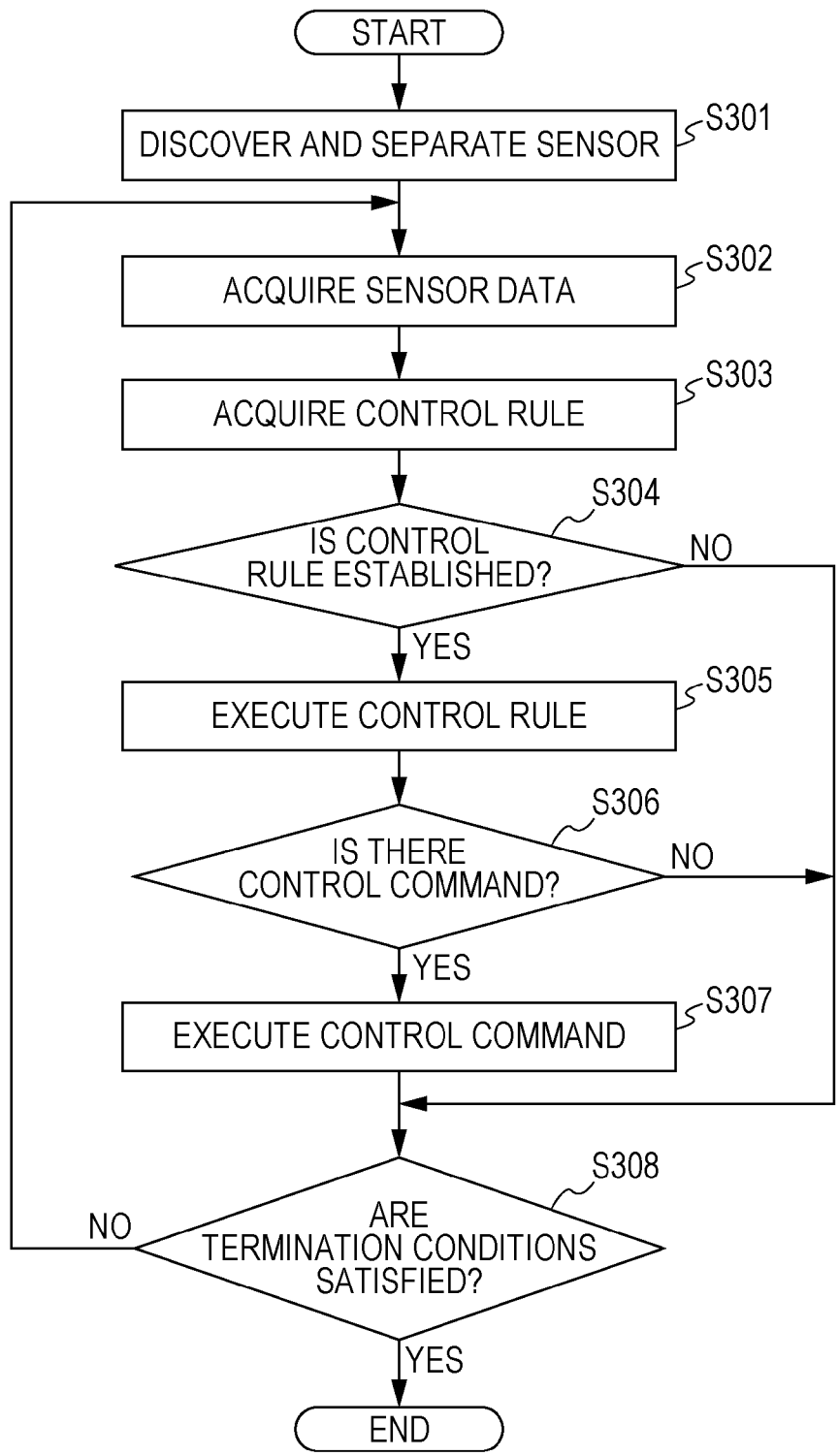
FIG. 13 is a flow diagram illustrating a control process according to the first embodiment of the present disclosure.

For example, in the above-mentioned embodiments, the procedure of the control system is shown in FIG. 13, but the present disclosure is not limited thereto. For example, the discovery and the separation of the sensor in step S301, or the sensor data acquisition in step S302 may be independently executed as a separate process.

In addition, the procedure of the control system may be periodically executed at regular intervals, and may be executed in a separate process of acquiring sensor information, using the acquisition of the sensor information as a trigger.

Meanwhile, the present disclosure may include the following configurations.

(1) A control apparatus including: a determination section that determines a control command according to sensor information, on the basis of a control rule capable of being set by a user for determining the control command controlling a device; and a control section that controls the device in accordance with the control command determined by the determination section.

(2) The control apparatus according to the above (1), wherein the control rule specifies a logical connection relationship of a sensor, a control rule module that specifies a relationship between an input value and an output value, and the control command.

(3) The control apparatus according to the above (2), wherein the control rule specifies a multiple-stage connection relationship of the control rule module.

(4) The control apparatus according to the above (2) or (3), further including a display control section that displays objects indicating the control rule module, the sensor, and the control command at the time of setting the control rule, and causes the user to select each of the objects.

(5) The control apparatus according to any one of the above (2) to (4), further including: a communication section that transmits and receives the control rule to and from another control apparatus; and a control rule accumulation section that accumulates the control rule.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A control apparatus comprising:
    a processor; and
    a memory device that stores instructions to be executed by the processor, the memory device including a determination section that determines a control command according to sensor information, on the basis of a control rule capable of being set by a user for determining the control command controlling a device, and a control section that controls the device in accordance with the control command determined by the determination section,
    wherein the control rule specifies a first stage and a second stage, the first stage outputting a plurality of independent first output values based on a plurality of first input values from a plurality of different types of sensors, and the second stage summing the first output values and outputting a command if the sum of the plurality of first output values meets a threshold.

2. The control apparatus according to claim 1, wherein the control rule specifies a logical connection relationship of at least one of the sensors, a control rule module that specifies a relationship between an input value and an output value, and the control command.

3. The control apparatus according to claim 2, wherein the first and second stages are part of a multiple-stage connection relationship of the control rule module.

4. The control apparatus according to claim 2, further comprising a display control section that displays objects indicating the control rule module, the at least one of the plurality of sensors, and the control command at the time of setting the control rule, and causes the user to select each of the objects.

5. The control apparatus according to claim 1, further comprising:
    a communication section that transmits and receives the control rule to and from another control apparatus; and
    a control rule accumulation section that accumulates the control rule.

6. A control method comprising:
    setting a control rule with a first stage and a second stage, the first stage configured to output a plurality of independent first output values based on a plurality of first input values from a plurality of different types of sensors, and the second stage configured to sum the first output values and output a command if the sum of the plurality of first output values meets a threshold;
    storing the control rule on a storage section of a memory device;
    determining via a processor a control command according to sensor information on the basis of the control rule stored in the storage section; and
    controlling the device in accordance with the control command.

7. A non-transitory computer readable medium that causes a computer to execute:
    a process of storing a control rule capable of being set by a user for determining a control command controlling a device in a storage section, wherein the control rule specifies a first stage and a second stage, the first stage outputting a plurality of independent first output values based on a plurality of first input values from a plurality of different types of sensors, and the second stage summing the first output values and outputting a command if the sum of the plurality of first output values meets a threshold;
    a process of determining the control command according to sensor information on the basis of the control rule stored in the storage section; and
    a process of controlling the device in accordance with the control command.

8. A control system comprising:
    a plurality of different types of sensors; and
    a control apparatus including
    a determination section that determines a control command according to sensor information received from the plurality of different types of sensors, on the basis of a control rule capable of being set by a user for determining the control command controlling a device, and
    a control section that controls the device in accordance with the control command determined by the determination section,
    wherein the control rule specifies a first stage and a second stage, the first stage outputting a plurality of independent first output values based on a plurality of first input values from the plurality of different types of sensors, and the second stage summing the first output values and outputting a command if the sum of the plurality of first output values meets a threshold.

* * * * *